Aug. 3, 1965
P. CHAGNON ETAL 3,198,723
APPARATUS FOR THE CONTINUOUS ELECTROLYTIC
REGENERATION OF ION EXCHANGE RESINS
Filed June 7, 1960
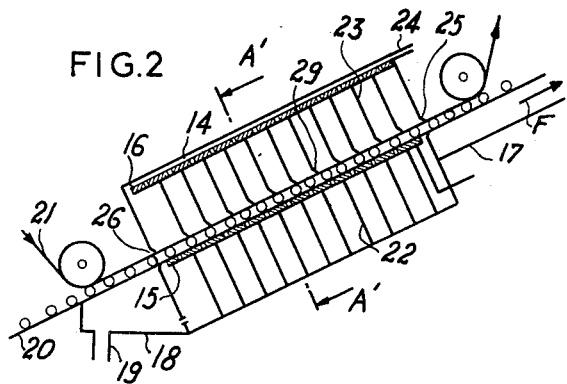
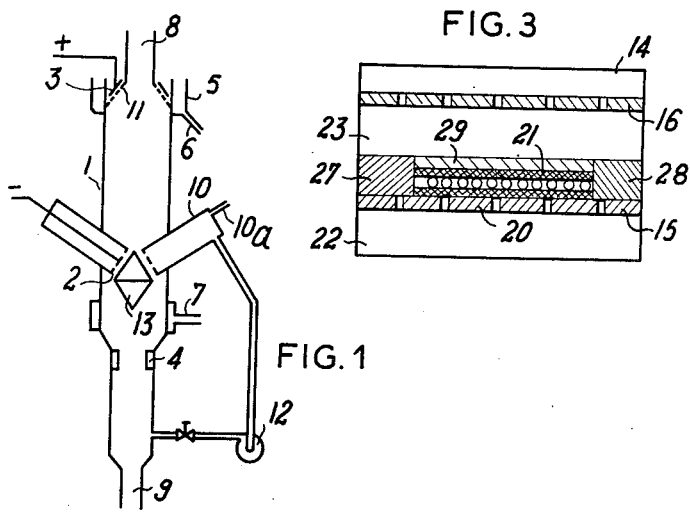

United States Patent Office

3,198,723
Patented Aug. 3, 1965

3,198,723
APPARATUS FOR THE CONTINUOUS ELECTROLYTIC REGENERATION OF ION EXCHANGE RESINS
Pierre Chagnon, Cite Layennes-Petite Rosette, and Roger Platzer, Chatillon-sous-Bagneux, France, assignors to Commissariat a l'Energie Atomique, Paris, France
Filed June 7, 1960, Ser. No. 34,496
Claims priority, application France, June 16, 1959, 797,629
5 Claims. (Cl. 204—299)

The present invention relates to a process for the continuous electrolytic regeneration of ion exchange resins.

The electrolytic regeneration of ion exchange resins is known. The rate and the efficiency of the regeneration depend on several factors; the difference of potential, the quantity of current, the distance separating the electrodes, the shape of the electrodes, the distance separating the resin from the electrode and the valency of the ions fixed to the resin.

Regeneration can occur in a cell where, in a first time period, there has occurred the fixation by the resin of one or several ions of the solution, namely the solution to be purified. This process requires the use of at least two identical cells, one effecting fixation while the other effects regeneration and vice versa. In these cells, the resin is stored and maintained static during the exchanges; this process has a number of disadvantages. In fact, between effecting fixation and effecting regeneration, there is a dead time during which rinsing of the cell is effected. This interruption of operation causes another dead time for return to stable conditions, on initiating the following cycle.

Regeneration can also be effected in an electrolysis cell distinct from the fixation cell. This arrangement requires extraction of the resin from the fixation cell and, if necessary, preliminary storage, then after regeneration, if necessary a second storage and return of the regenerated resin to the fixation cell. These auxiliary operations are carried out discontinuously and involve losses of material and time and, in the case of fixation on the exchange resin of radioactive materials, require the use of an expensive material for transport and protection.

The process of the invention remedies these disadvantages. This process is characterised in that one and/or both of the resin and the regeneration solution pass through the electrolytic regeneration cell in co-current or counter-current, the passage of the resin occurring as a compact bed, continuously and without storage, each granule of resin passing in the immediate vicinity of the electrodes.

In combining this process with a continuous process of fixation, by an ion exchange resin, of one or several ions of a solution to be purified, there is obtained a purification installation operating continuously in an automatic manner which can be remotely controlled. In fact, such an installation comprises three circuits:

(A) *A fixation circuit.*—The solution to be purified passes through a fixation cell and on leaving is deprived of the ion or ions fixed by the ion exchange resin passing countercurrently;

(B) *A resin exchange circuit.*—This resin which is to fix the ion or ions is arranged to flow in a compact bed and continuously into the electrolytic regeneration cell, in co-current or countercurrent with a regeneration solution to which it yields the ion or ions; the regenerated resin is then recycled into the fixation cell;

(C) *A regeneration circuit.*—The regeneration solution is introduced into the electrolytic cell in co-current or countercurrent to the ion exchange resin; it leaves this cell in the form of a solution of a salt or salts of the ion or ions.

With regulation of the liquid and solid outputs of the three circuits, the complete installation can operate in a manner which is continuous, automatic and, if required, remotely controlled.

The disadvantages inherent in previous devices and, in particular, the dead periods and storage are thus avoided.

Another particularity of this process is that the passage of a compact bed of the exchange resin allows a continuous displacement of the variations of concentration of the resin undergoing regeneration and of the solution for regeneration to be obtained.

Another feature of this process is that electroregeneration occurs in conditions favouring the yield, each granule of the ion exchange resin passing in the immediate vicinity of the electrodes.

In a first embodiment of the invention, the electrolytic cell is constituted by a vertical column. In this column, the ion exchange resin passes continuously from top to bottom, while the regeneration solution circulates from bottom to top. Adjustment of the output of resin can be effected by a device such as that described in French patent specification No. 1,176,525 of June 5, 1957. Since the output of such a column is quite low, a battery of identical columns can advantageously be employed, for example, for adapting the output of the regeneration circuit to the output of the fixation circuit.

In a second embodiment of the invention, the electrolytic cell is constituted by a casing mounted around a porous moving double cloth, the regeneration solution flowing in co-current or countercurrent to a monogranular layer of ion exchange resin included between two bands of the moving double cloth. This cell comprises two electrodes, one of which is a perforated plate applied to the band (anode for cations, cathode for anions) and the other of which is an identical plate situated on the other side of the band and several centimetres therefrom; baffle members cause the regeneration solution to remain in contact with the exchange resin.

Referring to the accompanying diagrammatic FIGURES 1–3, there is described below two embodiments given by way of example of the method of continuous electrolytic regeneration of ion exchange resin according to the invention.

FIG. 1 shows a diagrammatic view in section of a first embodiment;

FIG. 2 shows a diagrammatic view in section of a second embodiment;

FIG. 3 shows a diagrammatic view in section along A—A' of FIG. 2.

FIG. 1 shows the electrolytic cell formed by a column 1 and electrodes 2 and 3.

The column 1 comprises at its lower part a tubular restriction 4, at its top a circular gutter 5 provided with a discharge tube 6 and, above the restriction 4, a device 7 for the introduction of a regeneration solution; introduction of the resin occurs at 8 at the top of the column 1 and its removal via the tube 9.

The electrode 2 is a perforated plate having the form of an annular truncated conical frustum and constituting the base of a truncated part 10 provided at 10a with an outlet for gases (hydrogen and oxygen) resulting from the regeneration; the electrode 3, situated at the top of the column 1, is also a plate having the form of an annular truncated conical frustum; it is protected from contact with the resin by a truncated part 11 which is perforated or porous.

Adjustment of the output of the resin is effected by the device according to French patent specification No. 1,176,-525 of June 5, 1957 (FIG. 2 of this patent) and comprises the restriction 4 and a recirculation pump 12 supplied with the regeneration solution from the truncated part 10 and recycling it into the part of the column 1 situated under the restriction 4.

The angle to the horizontal formed by the electrode 2 is substantially equal to the angle to the horizontal formed by the natural cone of rest of the exchange resin within the regeneration solution. In the case, for example, of granules known under the name "Amberlite IRC-120" (sulphonated polystyrene type resin), the particle size of which ranges from 0.1 to 0.3 mm., this angle is about 35°. Preliminary adjustment of the distance separating the restriction 4 from the electrode 2 conditions the contact of the cone of rest with the electrode 2; thus all the granules of the ion exchange resin come in turn into the immediate vicinity of this electrode. In a variant of this embodiment, in order to render the regeneration column suitable for universal use, a part in the form of an apex of a cone or in the form of a double cone, such as 13, causes the grains of ion exchange resin to pass into the immediate vicinity of the electrode 2; this variant also allows the distance separating the restriction 4 from the electrode 2 to be no longer governed by the use of a resin of predetermined type in a regeneration solution of predetermined type.

In this embodiment, the electrodes 2 and 3 are of platinum, the column 1 is of an electrically non-conducting material, for example glass of a transparent plastics material; the diameter of the column is 2½ cm. and the distance separating the electrodes 2 and 3 is five cm. It is desirable to reduce as much as possible the distance between the electrodes to avoid heating by the Joule effect and to effect electrolysis under low tension in order to obtain a satisfactory yield.

For example, in this apparatus and employing as the ion exchange resin granules of "Amberlite IRC-120," the particle size ranging from 0.1-0.3 mm. and having ammonium ions fixed thereto, the potential applied to the electrodes is 5 volts for a resin output of 10-15 grams per hour and an output of regeneration solution, namely 5% acetic or citric acid solution, of 20-150 ml. per hour. The resin leaves the regeneration column regenerated at a rate varying from 40% to 50% in $H^+$.

Operation of this regeneration column is as follows:

The ion exchange resin, saturated with ion or ions fixed to it, is introduced in a continuous manner at 8 into the column 1. It passes downwards at the desired speed adjusted by means of the device constituted by the restriction 4 and the recirculation pump 12. It passes in the immediate vicinity of the electrode 2 and is discharged regenerated through the tube 9. During this descent, it is washed in the regeneration solution introduced at 7 and which, travelling countercurrently, leaves by overflow into the circular gutter 5 and then by the tube 6.

FIG. 2 shows the electrolytic cell formed by the casing 14 and the two electrodes 15 and 16.

The casing 14 comprises an inlet chute 17 for the regeneration solution and an outlet collector 18 therefor; this collector includes an outlet tube 19. The casing 14 surrounds a moving double cloth formed by the moving porous cloth covered with a mono-granular layer of ion exchange resin and by the moving cloth 21 which is also porous and which, at the entry into the casing 14, becomes applied to the mono-granular resin layer. This thus passes into the regeneration casing 14 between the two moving cloths 20 and 21, in the sense of the arrow "F," in the case of countercurrent operation, and in the reverse sense in the case of co-current operation.

The electrode 15 is a perforated plate applied against the moving cloth 20 by baffles such as 22. The electrode 16 is a perforated plate situated several cm. from the moving cloth 21 and carried by baffles such as 23. The inlet and outlet edges of the casing 14 are provided with very flexible joints 25 and 26. The baffles such as 23 carry lateral joints such as 27 and 28 (see FIG. 3) and transverse joints such as 29. These joints 25, 26, 27, 28 and 29 and the baffles 22 and 23 are intended to cause the regeneration solution to circulate between the two moving cloths and thus to ensure, in contact with the grains of exchange resin, an efficient co-current or countercurrent action. The continuous rubbing of the moving cloth 20 on the perforated electrode 15 permits degassing thereof, the gaseous products being removed through the orifice 24.

FIG. 3 is a diagrammatic view in section on A—A' of FIG. 2. This figure shows the moving cloths 20 and 21, between which the grains of resin to be regenerated are located, the baffles 22 and 23 and the two electrodes 15 and 16 fixed to the casing 14. The baffles 23 carry lateral elastic flanges such as 27 and 28 which rub on the edges of the moving cloths 20 and 21 and a transverse elastic flange such as 29 which rubs on the cloth 21. These flanges 27, 28 and 29 are constituted by very supple joints which cause the grains of resin to remain between the two cloths.

In this embodiment, the electrodes 15 and 16 are of platinum and the casing 14 as well as the baffles 22 and 23 are of an electrically non-conducting material, preferably polyvinyl chloride or polyethylene.

The operation of this regeneration casing is as follows:

The exchange resin in a mono-granular layer circulates between the two porous moving cloths 20 and 21 and undergoes regeneration at the rate and to the extent of its advancement in contact with the electrode 15. The regeneration solution introduced in the chute 17 travels through the moving cloths 20 and 21 in contact with the mono-granular layer of resin and leaves through the tube 19. The baffles 22 and 23 have th object of obtaining a concentration gradient from the inlet to the outlet of the device.

We claim:

1. Apparatus for the regeneration of granular ion exchange resins employing a constant electric potential between electrodes of opposite polarity between which the grains of resin to be regenerated and an electrolytic solution are located, a vessel in the form of a vertical column, a first electrode mounted within said column, a truncated conical lateral surface for said electrode coaxial with said column having the small base of the cone at the top, an entry for the grains of resin at the top of said column, an annular exit surrounding said column for the electrolytic solution, a second electrode arranged annularly within said column between the entry for the grains of resin and said exit for the solution, an entry for the solution above said first electrode in said column, an exit for the grains of resin at the lower extremity of said column and means for supplying a continuous electric potential to said electrodes.

2. Apparatus as described in claim 1 in which said first electrode is a grill and an annular hollow container passing through the lateral walls of said column with the interior of said container being opened to the atmosphere, said grill forming the base of said container.

3. Apparatus as described in claim 2 including a tube opening into said container, a circulating pump connected to said tube and discharging into said column between the entry for the electrolytic solution and the exit for the resin.

4. Apparatus as described in claim 3 including a restriction in said column located between the entry for the electrolytic solution and the discharge of said pump.

5. Apparatus as described in claim 1 including a conical member located coaxially and point up within said column, the lateral walls of said conical member extending parallel to and in the immediate proximity to said first electrode.

References Cited by the Examiner

UNITED STATES PATENTS

| | | | |
|---|---|---|---|
| 2,572,848 | 10/51 | Fitch | 210—33 |
| 2,963,431 | 6/55 | Dorn et al. | 210—33 |
| 2,763,607 | 9/56 | Staverman | 204—180 |
| 2,812,300 | 11/57 | Pearson | 204—180 |
| 2,853,448 | 9/58 | Heiskell | 204—180 |

FOREIGN PATENTS 773,421  4/57  Great Britain.

OTHER REFERENCES

McCormack et al.: Chem. Eng. Progress, 49, p. 404, 1953.

Muendel et al.: Industrial and Engineering Chemistry, 47, No. 3, pp. 374–379.

WINSTON A. DOUGLAS, *Primary Examiner*.

JOHN H. MACK, JOHN R. SPECK, *Examiners*.